United States Patent [19]

Carmen

[11] 4,412,249
[45] Oct. 25, 1983

[54] ULTRASONIC IMAGE STORAGE DEVICE AND METHOD

[75] Inventor: Ralph H. Carmen, Lebanon, N.J.

[73] Assignee: Technicare Corporation, Solon, Ohio

[21] Appl. No.: 338,731

[22] Filed: Jan. 11, 1982

[51] Int. Cl.³ .............................................. H04N 7/18
[52] U.S. Cl. ...................................... 358/112; 73/602; 128/660; 364/575
[58] Field of Search ........................ 358/112; 364/575; 73/602; 128/660

[56] References Cited

U.S. PATENT DOCUMENTS 3,792,194  2/1974  Wood ................................... 358/112
4,271,389  6/1981  Jacobi ..................................... 73/602

FOREIGN PATENT DOCUMENTS 2747405  8/1978  Fed. Rep. of Germany ....... 358/112

Primary Examiner—Howard Britton

[57] ABSTRACT

An improved ultrasonic imaging system and method are provided for medical diagnostic purposes. In order to store additional digital ultrasonic imaging information in a limited memory, a first digital signal representative of the ultrasonic image is provided. The first digital signal is companded to form a second digital signal, the second digital signal being stored. The companding provides a second digital signal which is a non-linear function of the first digital signal such that the granularity of the stored signal is increased in regions of high diagnostic interest at the expense of decreased resolution in areas of low diagnostic interest. When it is desired to display the stored digital image, the second digital signal is retrieved from the storage means and decompanded to provide the reconstituted first digital signal which is thereafter directed to a video display.

15 Claims, 6 Drawing Figures

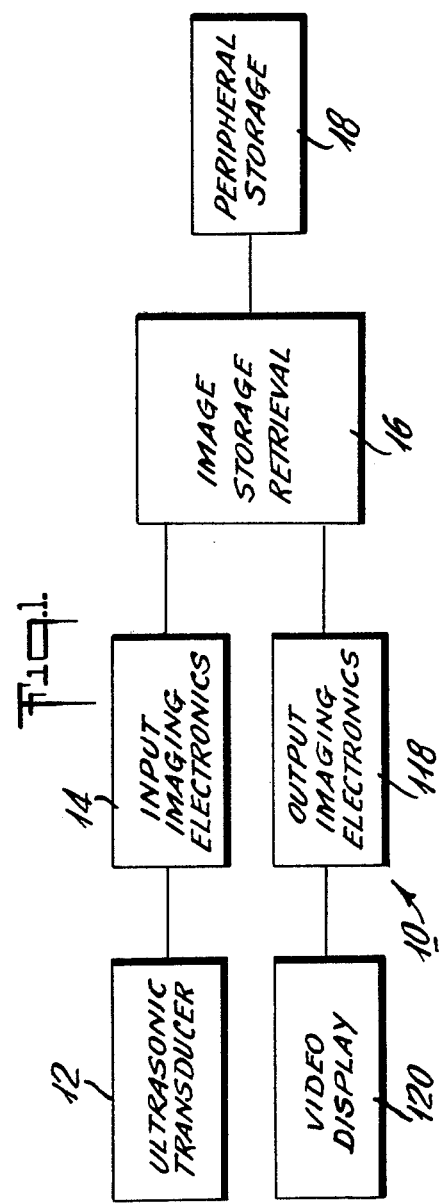
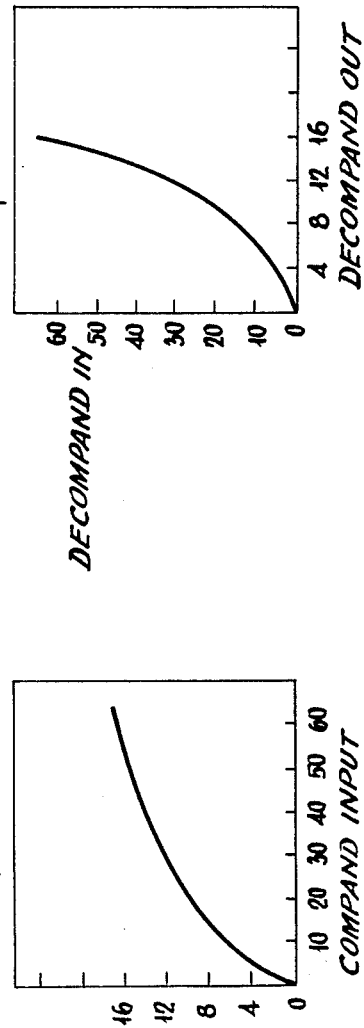

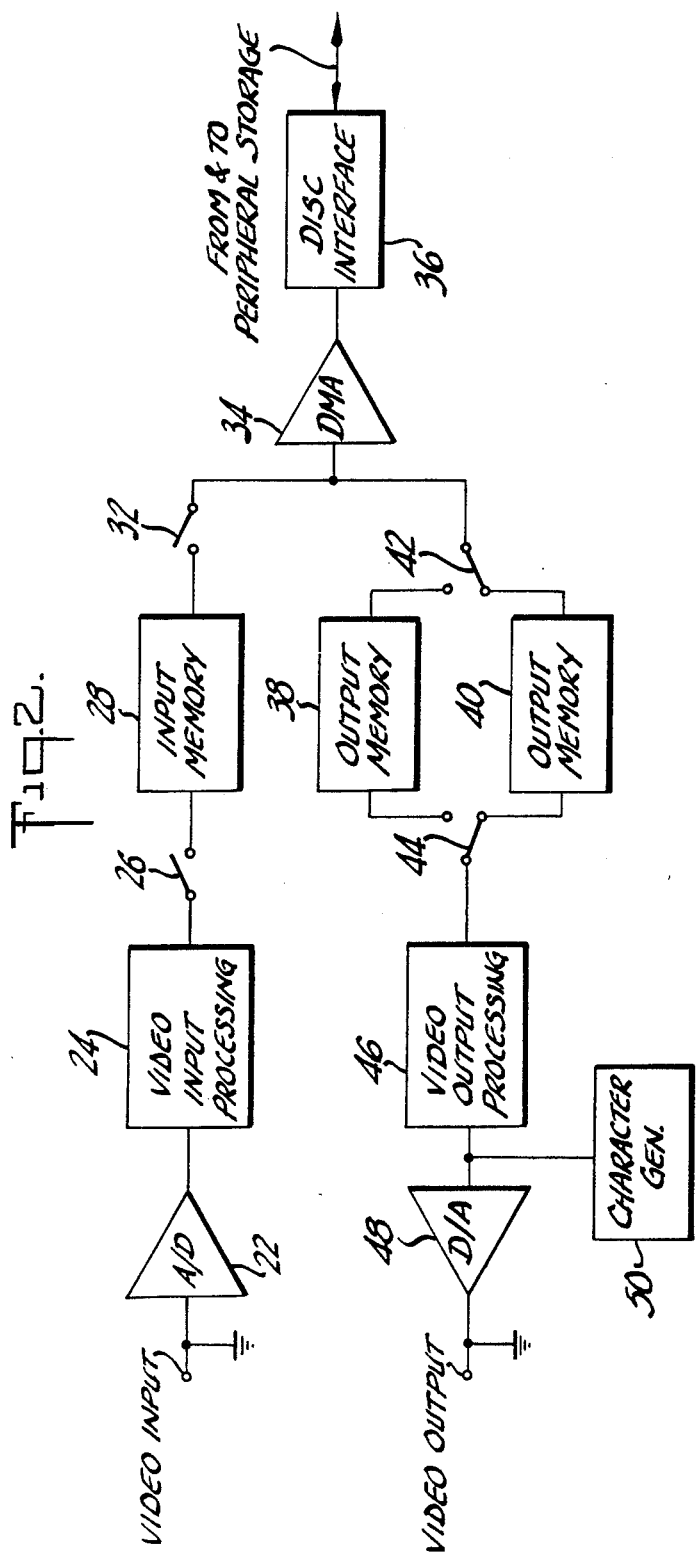

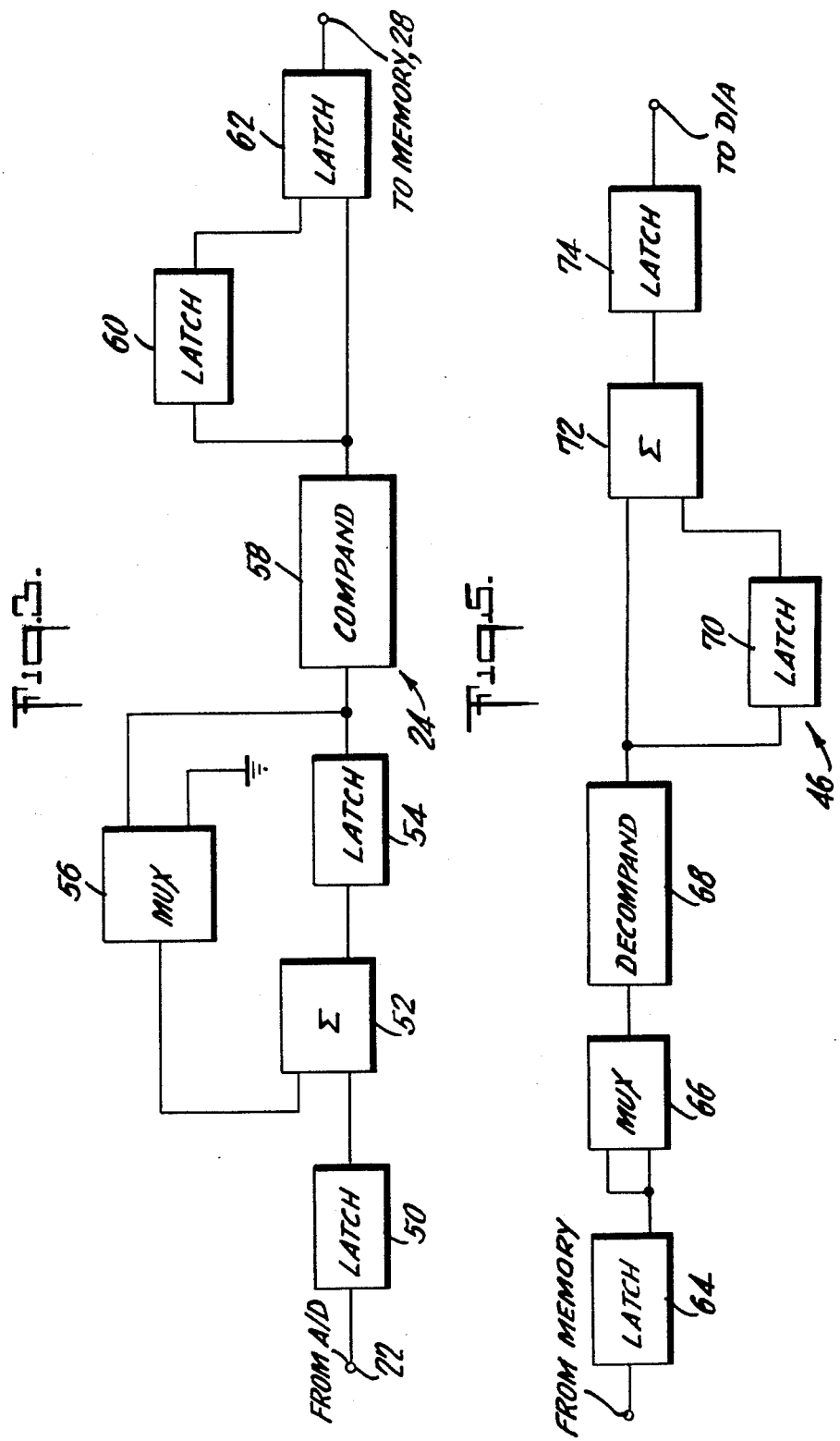

ULTRASONIC IMAGE STORAGE DEVICE AND METHOD

BACKGROUND OF THE INVENTION

The present invention relates, in general, to ultrasonic imaging, and, in particular, relates to an improved technique and device for storing and retrieving ultrasonic images of the type used in medical diagnostics.

Ultrasonic imaging has found increased utility in the field of medical diagnosis. For example, ultrasonic imaging is utilized extensively for the detection and diagnosis of mammarian cancer. It is also utilized to ascertain various stages of fetal development. A major problem encountered with ultrasonic imaging has been the need to find a suitable technique for storing and retrieving the vast quantities of data generated when ultrasonic imaging techniques are employed. One technique employed for storing such data is to store information on photographic film. However, a typical mammarian scan for a single patient may comprise as many as sixty pages of photographs per patient with four photographs per page. Because of the unwieldy nature of such photographic records, less than a complete set of records may be collected and maintained for a given patient. Since record selection is generally done by a technician, the technician's judgment as to which data should be collected and which discarded may be substituted for that of the physician.

To alleviate the disadvantage of unwieldy photographic records of ultrasonic imaging, digital storage of such images has been proposed. However, ultrasonic imaging generates large quantities of digital data. While digital data storage techniques are available to store large quantities of digital data, retrieving such information may be sufficiently time consuming so as to be undesirable for a busy physician. One alternative is to provide a minimum digital storage capacity and to simply collect less data. In this manner, information retrieval time may be minimized but fewer than the optimum number of records per patient may be stored. Alternatively, if many records per patient are stored, but with data density for each record reduced, the image resolution for each record may be less than optimum.

It would be desirable to provide an improved ultrasonic image data storage and retrieval technique and device which utilizes minimum digital storage capacity.

It would be still further desirable to provide such an ultrasonic image storage and retrieval device and technique which utilizes minimum storage capacity and yet which is capable of storing all imaging data which is diagnostically significant.

It would be still further desirable to provide such an ultrasonic image storage and retrieval device and technique having the capability for information retrieval in a short period of time.

It would be still further desirable to provide such a device and technique with good image resolution.

SUMMARY OF THE PRESENT INVENTION

The foregoing needs are met by the provision of a new ultrasonic image storage device and technique of the present invention which employs the technique of data companding and decompanding.

Specifically, the present invention accomplishes the foregoing objectives by the provision of an ultrasonic imaging system including means for storing and thereafter retrieving and displaying a video representation of an ultrasonic image which includes a means for producing a first digital representation of the video input signal. A companding means is provided for producing a second digital signal from the first digital signal. In accordance with the present invention, the second digital signal is a non-linear function of the first digital signal, the non-linear function being such as to provide increased granularity in regions of greater interest from a diagnostic standpoint and decreased granularity in regions of lesser interest. A means for storing and retrieving the second digital signal is provided and a decompanding means is provided to reconstitute the first digital signal from the retrieved second digital signal. The reconstituted first digital signal is thereafter converted to analog form for video display. Since the stored digital signal employs increased granularity in regions of high interest, resolution in regions of interest is improved at the expense of slightly increased distortion in regions of low diagnostic interest.

In accordance with an important aspect of the present invention, when ultrasonic imaging is utilized for the detection and diagnosis of, for example, mammarian cancer, low amplitude video input signals correspond to areas of possible malignancy. Accordingly, in accordance with the present invention, granularity of the stored digital signal is increased by the companding means for low level signals and decreased for high level signals. This is accomplished by insuring that the companding means produces a second digital signal which is a monotonically increasing function of the first digital signal, the function having a monotonically decreasing slope. Further, the decompanding means provides that the reconstituted digital signal produced thereby is a monotonically increasing function of the second digital signal input thereto with a monotonically increasing slope.

BRIEF DESCRIPTION OF THE DRAWINGS

The present invention will be more fully understood by reference to the accompanying drawings, in which:

FIG. 1 is a general block diagram of an ultrasonic imaging system employing the novel image storage and retrieval means of the present invention;

FIG. 2 is a schematic diagram of the image storage and retrieval means of FIG. 1;

FIG. 3 is a schematic circuit diagram of the video input processing circuit of FIG. 2;

FIG. 4 is a plot of the transfer function of the companding means of the video input processing circuit of FIG. 3;

FIG. 5 is a schematic circuit diagram of the video output processing circuit shown in FIG. 2; and FIG. 6 is a plot of the transfer function of the decompanding means of the video output processing circuit of FIG. 5.

DETAILED DESCRIPTION OF THE PREFERRED EMBODIMENT

Referring now to FIG. 1, the ultrasonic imaging system of the present invention is shown generally at 10. The imaging system 10 of the present invention has the capability of storing 240 records or frames of information per patient. The ultrasonic imaging system 10 of the present invention employs an ultrasonic transducer 12 of conventional type. Signals received by the ultrasonic transducer 12 are directed to input imaging electronics 14. The input imaging electronics 14 are also of conventional design. The input imaging electronics 14 provides an analog video input signal which is representative of the ultrasonic image detected by the transducer 12. 176 lines of the analog video input signal constitute one frame or record of information from a given patient. The analog video input signal emanating from the input imaging electronics 14 is directed, in accordance with the present invention, to an image storage and retrieval circuit 16 of the present invention, which will be described in detail in connection with FIG. 2 below. The image storage and retrieval circuit 16 is effective to convert the analog video input signal to digital form and for directing the digital signal to a peripheral storage means 18. The peripheral storage means 18 preferably comprises a three megabyte floppy disk. As mentioned above, when the ultrasonic transducer 12 is utilized for diagnostic purposes, 240 records or frames are preferably digitized and stored in the peripheral storage means 18, per patient. The image storage and retrieval means 16 retrieves patient records from the peripheral storage means 18 and converts such records to analog form. The converted analog signals are then directed to output imaging electronics 18, also of conventional design, which converts the signals to a form suitable for display on a cathode ray tube such as shown at 20.

Referring now to FIG. 2, the image storage and retrieval means 16 of the present invention will be described in detail. The image storage and retrieval means 16 of the present invention includes an analog-to-digital converter 22 which is responsive to the analog video input signal from the input imaging electronics 14. The analog-to-digital converter 22 samples the analog video input signal at a rate of, for example, 10 MHz to produce a first digital input signal representative of the analog input signal. The first digital signal preferably comprises 512 samples of information per line. Each sample comprises a 6-bit value corresponding to an instantaneous amplitude of the analog input signal. The first digital signal is directed to a video input processing circuit 24 which will be described in detail in connection with FIG. 3 below. The output of the video input processing circuit 24 is a second digital signal which comprises 64 bytes (eight bits) of information per line and which is directed through a switch 26 to an input memory 28. The output of memory 28 is connected by means of a switch 32 to a direct memory access means 34. When the imaging system of the present invention is in an input mode, switches 26 and 32 store the second digital signal emanating from the video input processing circuit 24 in the input memory 28. After the input memory 28 is filled with one frame of input information, a direct memory access means 34 transfers the stored information from input memory 28 through the disk interface 36 to the peripheral storage means 18. Images are directed to the peripheral storage means 18 at a rate of, for example, four frames per second.

When it is desired to retrieve a patient record from the peripheral storage means 18, the switches 26 and 32 are opened. Retrieved information from the peripheral storage means 18 is thereafter directed through the disk interface 36 and the direct memory access means 34 to either one or the other of output memories 38 and 40, the particular one being determined by the position of the switching means 42. Two memory means 38 and 40 are provided so that retrieval from the storage means 18 to either output memory 38 or 40 can be overlapped in time with viewing of a previously retrieved image in the alternate output memory 40 or 38. In this way, a continuous visual image is achieved.

When the imaging system of the present invention is operating in an output mode, each of the output memories 38 and 40 contain a second digital signal retrieved from peripheral storage means 18. This retrieved, second digital signal is directed through a switching means 44 to a video output processing circuit 46, which will be described in more detail in connection with FIG. 5 below. The video output processing circuit 46 reconstitutes the first digital signal from the second digital signal input thereto by performing an inverse transform to the type performed in the video input processing circuit 24. The first digital signal output from the video output processing circuit 46 is directed to digital-to-analog converter 48 which produces a video output signal substantially similar to the analog video input signal which was originally received from input imaging electronics 14. The video output signal is an analog signal which is directed to the video display 20 referred to in connection with FIG. 1 above.

In a preferred embodiment of the present invention, the image storage and retrieval means 16 of the present invention further includes a character generating means 50. The digital-to-analog converter 48 is responsive to the character generating means 50 so that alphanumeric information may be simultaneously or sequentially displayed along with patient records.

Referring now to FIG. 3, the video input processing circuit 24 shown in FIG. 2 will be described in detail. The video input processing circuit 24 preferably includes a means for reducing the data density of ultrasonic images in a direction lateral to the axis of the transducer 12. This means includes a first latch 50, a summing means 52, a second latch 54, and a first digital multiplexer 56. The means for reducing the data density of ultrasonic images in the lateral direction will be more completely described in copending application Ser. No. 338,730 filed concurrently on January 11, 1982 in the name of Ralph Carmen, entitled "IMPROVED ULTRASONIC IMAGE STORAGE DEVICE AND METHOD" which is incorporated herein by reference. The video input processing circuit 24 also includes in accordance with the present invention, a companding means 58, a third latch 60 and a fourth latch 62.

In accordance with the aforementioned copending Serial No. 338,730 filed Jan. 11, 1982, the first six-bit sample of the first digital input signal from the analog-to-digital converter 22 is directed to the first latch 50 and from there to the summing means 52, as shown. At the summing means 52, the first digital signal is added to the output of digital multiplexer 56, which output is initially zero. The output of the summing means 52 is directed to a second latch 54, the output of which is directed to a first input of the first digital multiplexer 56. The second eight-bit byte of the first digital input signal from the analog-to-digital converter 22 is then directed to the latch 50 and from there to the summing means 52, where it is added to the last preceding eight-bit byte of that digital signal from the digital multiplexer 56. After four successive interations, the sum of four bytes of the first digital input signal is directed to the companding means 58.

In accordance with the present invention, the companding means 58 is a random access memory, the output of which is a second digital signal (four bit), the second digital signal being a non-linear function of the first digital signal. In this manner, the granularity of the first digital signal is increased in regions of greater interest and decreased in regions of lesser interest. The transfer function of the companding means 58 will be described in detail in connection with FIG. 4 below. Since the output of the companding means 58 is a four-bit binary number and since the data format employed by most commonly utilized peripheral storage means is an eight-bit format, the output of the companding means 58 may be converted to an eight-bit format by taking the first four-bit byte from the companding means 58 and storing it in a latch 50. The next four-bit byte from the companding means 58 is immediately directed to the fourth latch (eight bit) 62, wherein the four-bit byte stored in latch 60 is combined to form an eight-bit byte directed to the input memory 28.

Referring now to FIG. 4, the transfer function of the companding means 58 will be described in detail. As may be seen in FIG. 4, when the transfer function (compand output versus compand input) is plotted, the plot is a monotonically increasing curve with a monotonically decreasing slope. Utilizing this transfer function, the granularity of low level input signals is increased at the expense of high amplitude level input signals. In this manner, resolution is enhanced for low level signals at the expense of high level signals, low level signals corresponding to areas of possible malignancy. Thus, from FIG. 4, it may be seen that a change in the value of the input to the companding means 58 produces a greater change in the value of the output of the companding means at lower values of the companding means input than at higher values of that input.

Referring now to FIG. 5, the video output circuit 46 will be described in detail. The video output processing circuit includes a latch 64 to which retrieved eight-bit digital information from the peripheral storage means 18 is directed. The digital signal from the latch 64 is directed to a multiplexer 66 in which it is converted to two four-bit bytes. The digital signal from the multiplexer 66 is then directed to the decompanding means 68 in accordance with the present invention. The decompanding means is operative to convert the retrieved second digital signal from the storage means 18 to a reconstituted first digital signal. The reconstituted eight-bit digital signal output from the decompanding means 68 is a non-linear function of the digital signal input thereto. The non-linear transfer function of the decompanding means 68 will be described in detail in connection with FIG. 6 below. The output of the decompanding means 68 is directed to a smoothing circuit comprised of a latch 70 and a summing means 72 which are described in detail in connection with copending application Ser. No. 338,730 filed Jan. 11, 1982. The output from the summing means 72, is then directed to a latch 74 and from there to the digital-to-analog converter 48.

Referring now to FIG. 6, the transfer function of the decompanding means 68 will be seen. As will be seen in FIG. 6, the transfer function of the decompanding means 58 (decompand input versus decompand output) is a monotonically increasing function with a monotonically increasing slope. Thus, the transfer function of the decompanding means 68 is the inverse of the transfer function of the companding means 58. In accordance with one aspect of the present invention, the companding means 58 comprises a random access memory, each value of the second digital signal stored therein being located at an address determined by a value of the first digital signal input thereto. The decompanding means 68 also comprises a random access memory storing the various values of the first digital signal at addresses determined by values of the retrieved second digital signal.

While a particular embodiment of the present invention has been shown and described in detail, it will, of course, be appreciated by those skilled in the art that various modifications may be made without departing from the spirit and scope of the present invention as defined by the accompanying claims.

What is claimed is:

1. An ultrasonic imaging system for collecting and thereafter displaying body tissue images comprising:
    an ultrasonic transducer;
    input imaging means for converting signals received by said transducer to an analog video input signal;
    means for producing a first digital signal representative of said video input signal;
    means for companding said first digital signal to produce a second digital signal, said second digital signal being a first non-linear function of said first digital signal;
    means for storing and retrieving said second digital signal;
    means for decompanding a retrieved second digital signal to reconstitute said first digital signal;
    means responsive to said decompanding means for converting said first digital signal to a video output signal substantially similar to said video input signal; and
    display means responsive to said video output signal for producing an image of said tissue.

2. The system of claim 1 wherein said first digital signal produced by said decompanding means is a second non-linear function of said retrieved second digital signal whereby certain regions of said image have enhanced resolution compared to certain other regions.

3. The system of claim 1 wherein said first non-linear function is a monotonically increasing function with a monotonically decreasing slope.

4. The system of claim 2 wherein said second non-linear function is a monotonically increasing function with a monotonically increasing slope.

5. The system of claim 2 wherein said first non-linear function is the inverse of said second non-linear function.

6. The system of claim 1 wherein said storage means comprises a floppy disk storage media.

7. The system of claim 1 further comprising a character generator, said means for producing a video output signal being selectively responsive thereto whereby said display means may selectively display alphanumeric characters in addition to said ultrasonic image.

8. The system of claim 1 wherein said means for companding comprises a random access memory, each value of said second digital signal being stored therein at an address determined by a value of said first digital signal sample.

9. The system of claim 8 wherein said decompanding means comprises a second random access memory, each value of said first digital signal being stored therein at an address determined by the value of said retrieved second digital signal.

10. A means for digitally storing and retrieving an ultrasonic image comprising:
    means for producing a first digital signal representative of said image;

means for companding said first digital signal to produce a second digital signal, said second digital signal being a first non-linear function of said first digital signal;

means for storing said second digital signal;

means for retrieving said second digital signal;

means for decompanding said retrieved second digital signal to reconstitute said first digital signal; and means responsive to said decompanding means to produce an analog output signal representative of said ultrasonic image.

11. The system of claim 10 wherein said first digital signal produced by said decompanding means is a second non-linear function of said retrieved second digital signal.

12. The system of claim 11 wherein said first non-linear function is a monotonically increasing function with a monotonically decreasing slope.

13. The system of claim 12 wherein said second non-linear function is a monotonically increasing function with a monotonically increasing slope.

14. The system of claim 13 wherein said first non-linear function is the inverse of said second non-linear function.

15. A method of storing and retrieving an ultrasonic image comprising:

providing an analog video input signal representative of said image;

converting said analog video input signal to produce a first digital signal representative of said image;

companding said first digital signal to produce a second digital signal, said second digital signal being a first non-linear function of said first digital signal;

storing said second digital signal;

retrieving said second digital signal;

decompanding said retrieved second digital signal to reconstitute said first digital signal; and converting said decompanded signal to an analog output signal representative of said image.

* * * * *